Oct. 10, 1967 L. R. UPCHURCH, JR 3,345,728

APPARATUS FOR MOUNTING WIRING OR THE LIKE

Filed Jan. 26, 1965

INVENTOR:
LAWSON R. UPCHURCH, JR.

BY Parrott, Bell, Seltzer, Park & Heard
ATTORNEYS

United States Patent Office 3,345,728

Patented Oct. 10, 1967

3,345,728

APPARATUS FOR MOUNTING WIRING OR THE LIKE

Lawson R. Upchurch, Jr., Box 308, Hamlet, N.C. 28345

Filed Jan. 26, 1965, Ser. No. 428,085
5 Claims. (Cl. 29—203)

This invention relates to an apparatus for mounting spaced apart lines of wiring or the like on a surface and more particularly to an apparatus whereby wiring may be easily mounted in parallel lines equally spaced from each other by any predetermined distances.

In mounting wiring on a surface, especially radiant heat wiring on the ceiling of a room or similar surfaces, problems have existed in positioning the wiring in parallel lines equally spaced from each other over the entire surface. For example, the mounting of radiant heat wiring has heretofore required the plotting of equally spaced parallel lines on the ceiling of the room corresponding to the desired location of the wiring and then the use of two workmen, one holding the wiring in place and the other securing the wiring to the ceiling, inasmuch as no apparatus has been available for the mounting operation. This is a necessarily costly and time consuming method of installing radiant heat wiring.

It is therefore an object of this invention to provide an apparatus for easily and quickly mounting spaced apart wiring on a surface which eliminates the problems heretofore encountered in such mounting operations.

It has been found that this object may be accomplished by providing apparatus comprising a pair of elongate expansible and contractible means adapted to be removably secured to the surface and a plurality of mounting members carried by and extending from the expansible and contractible means and spaced from each other equal predetermined distances determined by the amount of expansion or contraction of the expansible and contractible means. The mounting members are adapted to receive the wiring therearound extending between the pair of expansible and contractible means to form parallel lines of wiring spaced apart equal predetermined distances.

While this invention has been broadly described hereinbefore and will be more specifically described hereinafter in regard to mounting radiant heat wiring on the ceiling of a room, it is to be understood that this invention is not limited to the mounting of radiant heat wiring on the ceiling of a room, but is to include the mounting of any spaced apart wiring on a surface.

Some of the objects of the invention having been stated, other objects will appear as the description proceeds when in conjunction with the accompanying drawings, in which—

Figure 1:
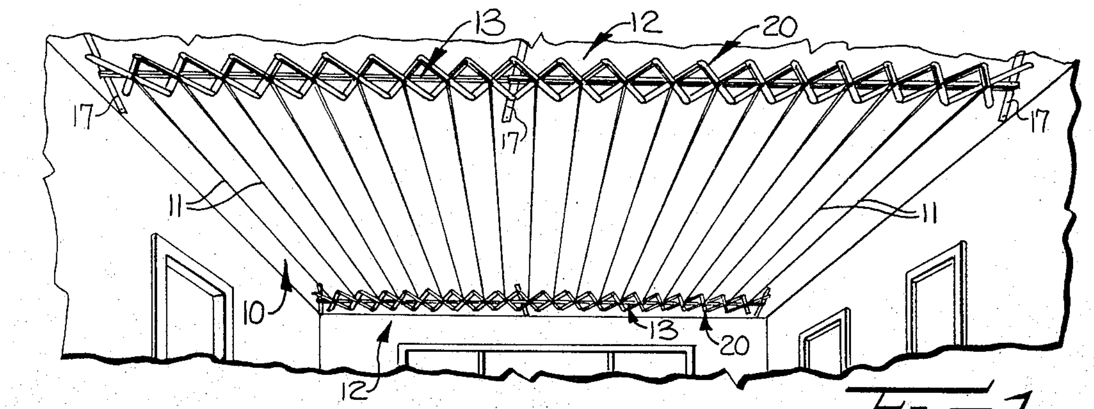
FIGURE 1 is a perspective view of a portion of the inside of a room having radiant heat wiring mounted on the ceiling thereof by the method and apparatus of this invention.

Referring now to the drawings, there is illustrated in FIGURE 1 a portion of the inside of a room having a surface or ceiling, generally indicated by the reference numeral 10, upon which the radiant heat wiring 11 or the like is to be mounted.

The apparatus for mounting this radiant heat wiring 11 comprises a pair of elongate expansible and contractible means, generally indicated by the reference numeral 12. Each of the expansible and contractible means 12 includes a track member 13 adapted to be removably secured to the ceiling 10. These track members 13 each comprise a pair of telescoping elongate hollow members 14 and 15 each having a mating longitudinal slot 16 therein of less width than the width of said track member. Each track member 13 further includes arms 17 pivotally secured thereto by pins 18. These arms 17 may be conveniently located at generally the end and middle portions of track members 13 and include apertures 19 therein for securing the track members 13 to the ceiling 10 by suitable screws, nails or the like. Due to the telescoping arrangement of the members 14 and 15 the track members 13 may be extended or contracted to the desired length for different size ceilings.

Each of the expansible and contractible means 12 further includes a lazy tong device, generally indicated by the reference numeral 20. These lazy tong devices 20 each comprise a first set of elongate toggle levers 21 disposed in parallel relationship with each other and a second set of elongate toggle levers 22 disposed in parallel relationship with each other and at an angle with said first group of toggle levers. These toggle levers 21 and 22 are pivotally connected with each other at the overlapping end and midle portions thereof by stud members, to be described hereinafter, passing through superposed apertures in the levers.

Figures 2, 3, 4, 5, 6, 7:
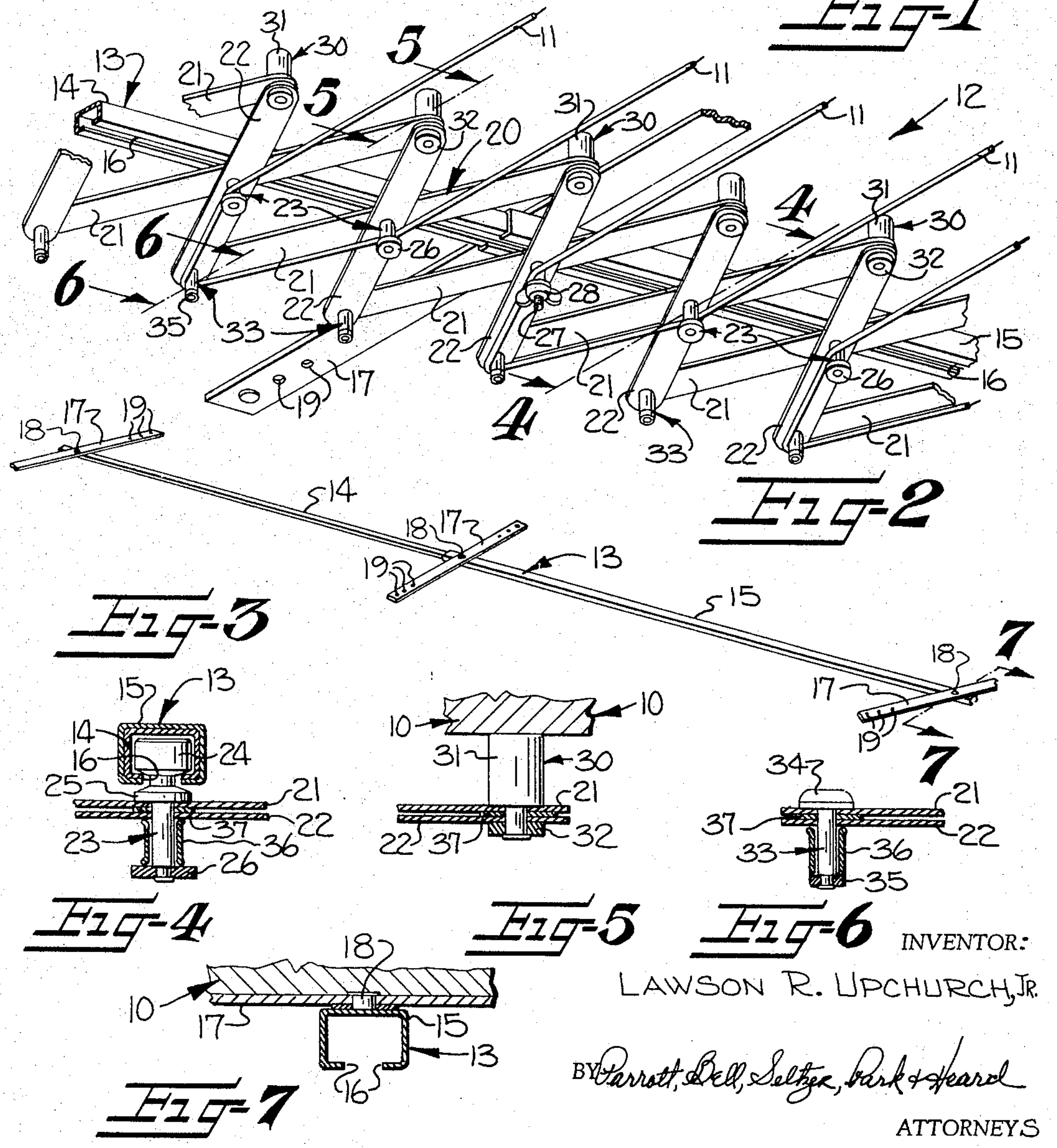
FIGURE 2 is a perspective view of the expansible and contractible means utilized in this invention.
FIGURE 3 is a perspective view of a telescoping track member included in the expansible and contractible means.
FIGURE 4 is a vertical cross-sectional view taken substantially along the line 4—4 of FIGURE 2.
FIGURE 5 is a vertical cross-sectional view taken substantially along the line 5—5 of FIGURE 2.
FIGURE 6 is a vertical cross-sectional view taken substantially along the line 6—6 of FIGURE 2.
FIGURE 7 is a vertical cross-sectional view taken substantially along the line 7—7 of FIGURE 7.

At the middle portions of the toggle levers 21 and 22, as shown in FIGURE 4, the pivotal connections are formed by elongate stud members 23 having enlarged head portions 24 on one of the ends thereof of greater width than the slots 16 in the track members 13 and adapted to cooperate with and to be disposed inside the track members 13 to slidably support the lazy tong devices 20 on the track members 13. The stud members 23 further include middle flange portions 25 adapted to be disposed between the track members 13 and the lazy tong devices 20 to serve as washers therebetween. The stud members 23 also include end flange portions 26 mounted on the other ends thereof and spaced from the toggle levers 21 and 22 in the direction opposite from the track members 13. Additionally, some of the stud members 23 include a threaded portion 27 extending through the flange portions 26 and adapted to receive wing nuts 28 for locking the toggle levers 21 and 22 in the desired extended or contracted position. These stud members 23 having wing nuts thereon may be alternately located, as desired, every four or five middle pivotal connections of the toggle levers 21 and 22.

At one of the end portions of the toggle levers 21 and 22, as shown in FIGURE 5, the pivotal connections are formed by elongate stud members 30 having elongate enlarged portions 31 on one of the ends thereof extending from the toggle levers 21 and 22 in the direction of the track members, for a purpose to be hereinafter described, and resting against the lever 21. The stud members 30 also include end flange portions 32 mounted on the other ends thereof and resting against the lever 22.

At the other end portions of the toggle levers 21 and 22, as shown in FIGURE 6, the pivotal connections are formed by elongate stud members 33 having enlarged head portions 34 on one of the ends thereof resting against the lever 21. The stud members 33 further include end flange portions 35 mounted on the other ends thereof and spaced from the toggle levers 21 and 22 in the direction opposite from the track members 13.

The expansible and contractible means 12 further include mounting members 36 in the form of hollow elongate sleeves extending from the middle and end pivotal connections of the toggle levers formed by stud members 23 and 33 in a direction opposite from the track members 13. These mounting members 36 are disposed around the stud members 23 and 33 to be retained between the toggle levers 20 and the flange portions 26 and 35 on the stud members 23 and 33. The mounting members 36 are of generally the same diameter as the flange portions 35 and are of lesser diameter than the flange portions 26, for a purpose to be hereinafter described.

The expansible and contractible means 12 may include suitable washers 37 disposed around the stud members 23, 30 and 33 between the toggle levers 20 and 21, and between the track members 13 and the levers 17, as illustrated in the drawings.

Inasmuch as the mounting members 36 extend from the pivotal connections formed at the end and middle portions of each of the toggle levers 20 and 21, they are equally spaced from each other predetermined distances determined by the amount of contraction or expansion of the lazy tong devices 20. These mounting members 36 are adapted to receive the wiring 11 therearound extending between the lazy tong devices 20, as may be seen in FIGURE 1, to form parallel lines of wiring spaced apart equal distances.

In utilizing the above described apparatus for mounting wiring, such as radiant heat wiring, on a surface, such as a ceiling of a room, a pair of telescoping track members 13 are removably secured to opposite ends of the ceiling 10 by suitable screws, nails or the like passing through apertures 19 in the arm 17. Lazy tong devices 20 are then disposed in sliding relationship with the track members 13 by placing the enlarged head portions 24 of stud members 23 within the hollow track members 13, as shown in FIGURE 4 and locating the enlarged portions 31 of stud members 30 inwardly of the ceiling 10 in abutting relationship thereto to serve spacer members to hold the lazy tong devices in generally a parallel plane to the ceiling 10. The lazy tong devices 20 are expanded or contracted the desired distance to space the mounting members 36 the desired distances from each other and locked in position by tightening the wiring nuts 28 on stud members 23. During this expansion or contraction, the distance between any two mounting members may be measured and the corresponding distances between the other mounting members will be the same. The wiring 11 may then be strung around the mounting members 36 between the lazy tong devices 20 in any desired manner to form parallel lines of wiring spaced apart equal predetermined distances, as may be seen in FIGURE 1.

A preferred form of stringing the wiring 11 around these mounting members 36 is shown in FIGURES 1 and 2. As illustrated therein, the wiring 11 passes around the mounting members 36 to form generally a V-shaped loop between the ends of adjacent lines of wiring which strings the wire without any very sharp bends therein which might be damaging to the wire. The mounting members 36 disposed around stud members 33 are located at the vertex of these V-shaped loops. The wiring 11 is retained in this configuration on the mounting members 36 by the flange portions 35 since they are of greater diameter than the mounting members 36.

The wiring may then be secured to the ceiling 10 in this configuration by any suitable means, such as staples, clamps or the like. When the wiring 11 has been thus secured to the ceiling 10, it may be easily removed from the mounting members 36 disposed around stud members 33 since the flange portions 35 are of the same diameter as the mounting members. When this is accomplished, sufficient slack will be present in the wiring to remove it from the mounting members disposed around stud members 23.

The track members 13 and the lazy tong devices 20 are then removed from the ceiling 10 for subsequent mounting operations leaving the wiring 11 mounted on the ceiling 10 in the desired position.

Thus it may be seen that this invention has provided a method and apparatus by which wiring may be easily and quickly mounted on a surface and which eliminates the problems heretofore encountered in such mounting operations.

In the drawings and specification there has been set forth a preferred embodiment of the invention and, although specific terms are employed, they are used in a generic and descriptive sense only and not for purposes of limitation, the scope of the invention being defined in the claims.

What is claimed is:

1. Apparatus for mounting spaced apart wiring or the like on a surface comprising a pair of track members adapted to be removably secured to the surface, a lazy tong device adapted to expand and contract associated with each of said track members and having members extending therefrom in the direction of said track members for cooperation with said track members to slidably support said lozy tong devices on said track members, and mounting members carried by and extending from said lazy tong devices in a direction opposite from said track members and spaced from each other equal predetermined distances determined by the amount of expansion or contraction of said lazy tong devices, said mounting members being adapted to receive the wiring therearound extending between said pair of lazy tong devices to form parallel lines of wiring spaced apart equal predetermined distances.

2. Apparatus for mounting spaced apart wiring or the like, as set forth in claim 1, in which each of said track members comprise a pair of telescoping members so that said track members may be selectively extended and contracted to fit different size surfaces.

3. Apparatus for mounting spaced apart wiring or the like, as set forth in claim 1, in which said lazy tong devices comprise a first set of elongate toggle levers disposed in parallel relationship with each other, a second set of elongate toggle levers disposed in parallel relationship with each other and at an angle to said first set of toggle levers, said first and second sets of toggle levers being pivotally connected with each other at the end and middle portions of each of said toggle levers.

4. Apparatus for mounting spaced wiring or the like, as set forth in claim 3, in which said mounting members extend from the pivotal connections at one end portion and the middle portions of said toggle levers to provide a variety of mounting positions for the wiring.

5. Apparatus for mounting spaced apart wiring or the like on a surface comprising a pair of track members adapted to be removably secured to the surface, each of said track members comprising a pair of telescoping members so that said track members may be selectively extended and contracted to fit different size surfaces, a lazy tong device adapated to expand and contract associated with each of said track members and having members extending therefrom in the direction of said track members for cooperation with said track members to slidably support said lazy tong devices on said track members, said lazy tong devices comprising a first set of elongate toggle levers disposed in parallel relationship with each other and a second set of elongate toggle levers disposed in parallel relationship with each other and at an angle to said first set of toggle levers, said first and second sets of toggle levers being pivotally conected with each other at the end and middle portions of each of said toggle levers, and mounting means carried by and extending from the pivotal connections at one end portion and the middle portions of said toggle levers in a direction opposite from said track members and spaced from each other equal predetermined distances determined by the amount of expansion or contraction of said lazy tong devices to provide a variety of mounting positions for the wiring, said mounting means being adapted to receive the wiring therearound extending between said pair of lazy tong devices to form parallel lines of wiring spaced apart equal predetermined distances.

References Cited

UNITED STATES PATENTS

| | | | |
|---|---|---|---|
| 1,649,809 | 11/1927 | Campbell | 29—203 |
| 1,924,477 | 8/1933 | Wulf | 254—122 |
| 2,430,011 | 11/1947 | Gillentine | 254—122 X |
| 3,170,232 | 2/1965 | Craver | 29—464 |

JOHN F. CAMPBELL, *Primary Examiner.*

THOMAS H. EAGER, *Examiner.*